US 8,343,769 B2

United States Patent
Kinoshita et al.

(10) Patent No.: US 8,343,769 B2
(45) Date of Patent: Jan. 1, 2013

(54) IMMERSION SOLUTION FOR MICROSCOPE

(75) Inventors: Hiroaki Kinoshita, Akishima (JP); Atsushi Niwa, Kyoto (JP); Masahiro Sato, Otsu (JP)

(73) Assignee: Olympus Medical Systems Corp., Tokyo (JP)

( * ) Notice: Subject to any disclaimer, the term of this patent is extended or adjusted under 35 U.S.C. 154(b) by 0 days.

(21) Appl. No.: 13/314,622

(22) Filed: Dec. 8, 2011

(65) Prior Publication Data

US 2012/0138863 A1    Jun. 7, 2012

Related U.S. Application Data

(63) Continuation of application No. PCT/JP2011/059019, filed on Apr. 11, 2011.

(30) Foreign Application Priority Data

Apr. 28, 2010  (JP) ................................. 2010-104182

(51) Int. Cl.
*G01N 31/00*   (2006.01)
*G01N 23/00*   (2006.01)

(52) U.S. Cl. ........... 436/18; 250/311; 250/306; 250/309

(58) Field of Classification Search .................... 436/18; 250/311, 306, 309
See application file for complete search history.

(56) References Cited

U.S. PATENT DOCUMENTS

| 7,880,144 B2 * | 2/2011 | Kuwabata et al. ............ 250/311 |
| 2005/0065020 A1 * | 3/2005 | Holbrey et al. ............... 502/162 |
| 2006/0008392 A1 | 1/2006 | Graham et al. |
| 2006/0060817 A1 | 3/2006 | Tempel et al. |
| 2006/0060818 A1 | 3/2006 | Tempel et al. |
| 2007/0217967 A1 | 9/2007 | McDermott et al. |
| 2009/0272938 A1 | 11/2009 | Tempel et al. |

FOREIGN PATENT DOCUMENTS

| EP | 1 614 955 A1 | 1/2006 |
| EP | 1 640 654 A1 | 3/2006 |
| EP | 1 988 326 A1 | 11/2008 |
| JP | 2002-053839 | 2/2002 |
| JP | 2006-150346 | 6/2006 |
| JP | 2008-134517 | 6/2008 |
| JP | 2008-304056 | 12/2008 |
| JP | 2010-014808 | 1/2010 |

* cited by examiner

*Primary Examiner* — Jill Warden
*Assistant Examiner* — Monique Cole
(74) *Attorney, Agent, or Firm* — Scully Scott Murphy & Presser, PC

(57)   ABSTRACT

An immersion solution for a microscope, the immersion solution including a metal-halogeno complex anion containing bromine or iodine and one or more types of metal elements M selected from Sn, In, Bi, Sb, Zn and Al, and an imidazolium cation, a pyridinium cation, a pyrrolidinium cation or an ammonium cation. The immersion solution includes an ionic liquid that transmits light having a predetermined wavelength, has a refractive index of no less than 1.60 and is used for a fluorescence microscope.

10 Claims, No Drawings

IMMERSION SOLUTION FOR MICROSCOPE

CROSS REFERENCE TO RELATED APPLICATION

This application is a continuation application of PCT/JP2011/059019 filed on Apr. 11, 2011 and claims benefit of Japanese Application No. 2010-104182 filed in Japan on Apr. 28, 2010, the entire contents of which are incorporated herein by this reference.

BACKGROUND OF THE INVENTION

1. Field of the Invention

The present invention relates to an immersion solution for a microscope, which is used for an optical apparatus.

2. Description of the Related Art

In optical apparatuses such as a microscope, various types of immersion oils are used as an immersion solution. An immersion solution is a liquid used for optical characteristics improvement by charging the immersion solution into a space in which, e.g., air is present between optical components of an optical apparatus or between an optical component and an object of the optical apparatus. For example, in an optical apparatus for observing an specimen placed close to a lens, such as a microscope, charge of an oil having a large refractive index between an objective lens and a specimen as an immersion oil enables not only a decrease in optical aberrations but also an increase in numerical aperture of the objective lens to raise the magnification of the objective lens. For example, Japanese Patent Application Laid-Open Publication No. 2002-53839 discloses an immersion oil with a refractive index increased by mixing antimony halide such as antimony tribromide into a liquid organic compound such as diethylene glycol.

Meanwhile, fluorescence imaging in which a specimen is illuminated with excitation light having a certain wavelength to image/measure feeble fluorescence generated by the specimen is performed using, e.g., fluorescence microscopes. In fluorescence imaging, a bright optical system having a large numerical aperture is used to image feeble fluorescence; however, it is necessary that an immersion oil to be used in a fluorescence microscope including an optical system having a large numerical aperture have a high refractive index.

Furthermore, in fluorescence imaging, fluorescence generated by an immersion oil (auto fluorescence) acts as background noise in an fluorescence image observed; however, the aforementioned high refractive index immersion oil is not one manufactured for use in fluorescence measurement, and thus, it is difficult to perform fluorescence imaging using such high refractive index immersion oil. Thus, in Japanese Patent Application Laid-Open Publication No. 2008-134517, the present applicant discloses that an immersion oil with small auto fluorescence can be obtained by removing impurities from a high refractive index immersion oil obtained by adding, e.g., sulfur in diiodomethane.

Also, in time-plus imaging in which a cell is imaged for several days with a temperature of the cell maintained at 37° C., a problem of deterioration in characteristics of an immersion oil resulting from a decomposition reaction sometimes occurs. Thus, there has been a demand for a more stable, that is, persistent and non-volatile immersion solution.

Meanwhile, ionic liquids, which are also referred to as ambient temperature molten salts or room temperature molten salts, each have a low melting point in spite of being salts, and thus, the ionic liquids melt even at around room temperature, and exhibit high conductivity. Ionic liquids have drawn attention as electrolytes because of their characteristics such as non-volatility and flame resistance. Also, Japanese Patent Application Laid-Open Publication No. 2010-14808 discloses a solution containing an ionic liquid material is used as a lens.

SUMMARY OF THE INVENTION

An immersion solution for a microscope according to an embodiment of the present invention includes an ionic liquid that transmits light having a predetermined wavelength, the ionic liquid including a metal-halogeno complex anion containing chlorine, bromine or iodine and a metal element, and a cation.

DETAILED DESCRIPTION OF THE PREFERRED EMBODIMENTS

An immersion solution for a microscope (hereinafter also referred to as "immersion solution IM") according to an embodiment of the present invention is a high-refractive index transparent liquid that is preferable for use in a total internal reflection fluorescence microscope (TIRFM). In total internal reflection fluorescence imaging (evanescence method), laser light is totally reflected using a difference in refractive index between a cover glass and a water solution. Light seeping to the water solution side by several hundreds of nanometers is evanescent light. Use of evanescent light as excitation light enables only fluorescence molecules that are very close to the cover glass to gleam. A background of a total internal reflection fluorescence image observed is dark, and thus, even with feeble fluorescence, an image with a very good contrast can be obtained. Also, the immersion solution according to the present embodiment is used by charging the immersion solution between a lens and a cover glass.

The immersion solution IM is an ionic liquid containing cations, and anions that contain a metal element. An ordinary ionic liquid has a refractive index of less than 1.5; however, we have found that an ionic liquid containing anions that contain a metal element has a higher refractive index and has a possibility of use as an immersion solution.

The cations and the anions in the immersion solution IM are mixed in an electrochemically-stoichiometric state. For example, monovalent cations and monovalent anions are mixed at an equimolar ratio, and divalent cations and monovalent anions are mixed at a molar ratio of 1:2. If unreacted cations exist, an ionic liquid with desired characteristics (in, e.g., viscosity and melting point) can be obtained by adding 0.9 to 1 part of anions relative to one part of cations.

Here, for use as an immersion solution, it is important that an ionic liquid transmit light with used wavelengths, that is, have not a photoabsorption band.

Here, the used wavelengths mean wavelengths of visible light (380 to 750 nm) in the case of optical microscopes, and a wavelength of excitation light and wavelengths of fluorescence in the case of fluorescence microscopes. In general, excitation light has a wavelength of U (365 nm), UV (405 nm), B (488 nm) or G (533 nm). Although wavelengths of fluorescence are determined depending on the fluorescent substance, in general, wavelengths of fluorescence are longer than a wavelength of excitation light by around 20 to 100 nm For example, in the case of B (488 nm) excitation, wavelengths of fluorescence are 510 to 580 nm, and thus, the used wavelengths (excitation wavelengths) are around 450 to 600 nm Furthermore, "an ionic liquid transmits light" means that an ionic liquid has a light transmissivity of a level having no problem for practical use as an immersion solution, for example, no less than 30%, preferably no less than 50%, more preferably no less than 80%, per 1 mm of the immersion solution. In the case of fluorescence imaging, it is preferable that an ionic liquid have high light transmissivity to feeble light with fluorescence wavelengths. With the aforementioned percentages or higher, a favorable observed image can be obtained when an ionic liquid is used as an impregnant solution for a fluorescence microscope.

As has already been described, an ionic liquid is, for example, a salt that is liquid at ambient temperature but in the case of an immersion solution used for time-plus imaging at 37° C., it is only necessary that the ionic liquid be liquid at least at 37° C.

For a cation in an ionic liquid used for the immersion solution IM, it is preferable to use an imidazolium cation, a pyridinium cation, a pyrrolidinium cation or an ammonium cation.

An imidazolium cation is one obtained by cationization of an imidazole compound, and examples of the imidazolium cation include 1-alkyl-3-methylimidazolium such as 1-ethyl-3-methylimidazolium, 1-propyl-3-methylimidazolium, 1-butyl-3-methylimidazolium, 1-hexyl-3-methylimidazolium, 1-octyl-3-methylimidazolium, and 1-decyl-3-methylimidazolium, and 1-ethyl-2,3-dimethylimidazolium, 1-butyl-2,3-dimethylimidazolium, 1-hexyl-2,3-dimethylimidazolium and 1-octyl-2,3-dimethylimidazolium.

A pyridinium cation is one obtained by cationization of a pyridine compound, and examples of the pyridinium cation include 1-methylpyridinium, 1-ethylpyridinium, 1-propylpyridinium, 1-butylpyridinium, 1-butyl-4-methylpyridinium, 1-ethyl-3-methylpyridinium and 1-ethyl-3-(hydroxymethyl)pyridinium.

A pyrrolidinium cation is one obtained by cationization of a pyrrolidine compound, and examples of the pyrrolidinium cation include 1-methyl-1-butylpyrrolidinium, 1-methyl-1-hexylpyrrolidinium, 1-methyl-1-octylpyrrolidinium, 1,1-dipropylpyrrolidinium, 1,1-dihexylpyrrolidinium and 1,1-dibutylpyrrolidinium.

An ammonium cation is one obtained by conversion of a tertiary amine into an ammonium ion, and examples of the ammonium cation include tetramethylammonium, triethylmethylammonium, tripropylmethylammonium, tributylmethylammonium, octyltrimethylammonium, hexyltrimethylammonium and methyltrioctylammonium.

Among these, it is preferable to use a pyrrolidinium cation including no unsaturated bond for an immersion solution, which is required to have high transmissivity to a visible light wavelength band.

Meanwhile, for an anion, one containing a metal element is used. In the present invention, a metal element is a general term for elements that form metal binding, and the metal elements are elements positioned to the left of an oblique line connecting B, Si, As, Te and At in the periodic table. In other words, the metal elements include alkali metal elements (group 1 elements), alkaline-earth metal elements (group 2 elements), transition metal elements (groups 3 to 11) and a part of typical metal elements (groups 12 to 15). Here, the group 12 elements are sometimes classified into transition metal elements, but in the present invention, the group 12 elements are regarded as typical metal elements.

For a metal element M contained in the anions in the ionic liquid used for the immersion solution IM, a transition metal element such as Ta or Nb may be used; however, a typical metal element (12 to 15 groups) is preferable, one or more types of elements selected from Sn, In, Bi, Sb, Zn and Al are more preferable, and Sn is most preferable. The reasons include: (1) having a high refractive index; (2) not raising the melting point of the ionic liquid; (3) having high transmissivity; (4) facilitating synthesis and purification of anions; and (5) having low toxicity.

Impure metal elements, other than the metal element M added to enhance the refractive index, decrease the transmissivity of the immersion solution IM, and thus, the amounts of such coloring impure metal elements are each controlled to be preferably no more than 10 ppm and more preferably, no more than 1 ppm.

For an anion containing in the metal M in the ionic liquid, specifically, a metal-halogeno complex ion containing a halogen element larger than fluorine, which is expressed by the general expression $[MCl_xBr_yI_z]^{n-}$. In the foregoing chemical formula, a ratio between M and halogen is arbitrarily selected according to the relationship with cations.

An ionic liquid containing metal-fluoro complex ions as anions does not have a refractive index of no less than 1.5. Meanwhile, an ionic liquid containing metal-bromo complex ions or metal-iodine complex ions as anions, which have a large atomic weight, have a refractive index of no less than 1.6. However, such ionic liquid containing metal-bromo complex ions or metal-iodine complex ions as anions have a tendency of the transmissivity to decrease, and thus, metal-halogeno complex ions with the proportions of chlorine, bromine or iodine adjusted according to the purpose are used.

Although an upper limit value of the refractive index of the ionic liquid containing metal-halogeno complex ions as anions is not specifically determined, at the present time, it is difficult to obtain an ionic liquid that has a refractive index exceeding 1.90 and can be used for an immersion solution, because of the trade-off relationship between the transmissivity and the stability. Furthermore, there is only a small demand for an immersion solution having a refractive index exceeding 1.90.

In other words, it is necessary that an immersion solution have a refractive index complying with an optical system used, and thus, it is not simply that the refractive index is higher, the better. Thus, if an ionic liquid containing metal-halogeno complex ions as anions has an refractive index that is excessively high for an optical system, such ionic liquid can be mixed with, for example, an ionic liquid with a low refractive index not containing metal-halogeno complex ions as anions, enabling obtainment of a desired refractive index.

Hereinafter, a further detailed description will be provided using examples and a comparative example.

EXAMPLE 1

Raw material 1: 1-butyl-3-methylimidazolium iodide
Raw material 2: tin chloride (II) (Sn(II)Cl$_2$)
Raw material 1 and raw material 2 above were mixed so as to have a ratio of 2:1, and then stirred under a nitrogen atmosphere at room temperature for 24 hours, whereby an immersion solution was obtained.

EXAMPLE 2

Raw material 1: 1-hexyl-3-methylimidazolium iodide
Raw material 2: tin bromide (II) (Sn(II)Br$_2$)
Raw material 1 and raw material 2 above were mixed so as to have a ratio of 2:1, and then stirred under a nitrogen atmosphere at room temperature for 24 hours, whereby an immersion solution was obtained.

EXAMPLE 3

Raw material 1: 1-butyl-3-methylimidazolium bromide
Raw material 2: aluminum iodide ($AlI_3$)

Raw material 1 and raw material 2 above were mixed so as to have a ratio of 1:1, and then stirred under a nitrogen atmosphere at room temperature for 24 hours, whereby an immersion solution was obtained.

EXAMPLE 4

Raw material 1: 1-butyl-3-methylimidazolium iodide
Raw material 2: antimony tribromide ($SbBr_3$)

Raw material 1 and raw material 2 above were mixed so as to have a ratio of 1:1, and then stirred under a nitrogen atmosphere at room temperature for 24 hours, whereby an immersion solution was obtained.

EXAMPLES 5 to 7

The ionic liquid according to each of examples 1 to 3 was further purified to decrease an amount of metal impurities other than tin or aluminum contained in the anions, and free iodine and free bromine The purification was performed under an inert gas atmosphere, using a reduced-pressure distillation method.

The purification method for removal of impurities is not limited to distillation, and, e.g., a method using an adsorbent, a method using recrystallization or a method using sublimation can be used, and a combination of two or more of these methods can also be used.

In the case of purification using an adsorbent, for the adsorbent, for example, silica gel, activated carbon, alumina or clay can be used. Preferably, silica gel or activated carbon is used. The ionic liquid is made to flow in a hollow portion of an adsorbent having a tubular shape, an absorbent is suspended in the ionic liquid and then filtered, or a particulate absorbent is placed in a mesh container and soaked in the ionic liquid, whereby the impurities can be absorbed. An amount of absorbent used is, for example, preferably 0.01 to 5 g, more preferably, 0.05 to 3 g relative to 10 ml of the ionic liquid. With a value in the aforementioned ranges or more, a large impurity removal effect can be provided, and with a value in the aforementioned ranges or less, there is no decrease in collection ratio.

For purification using distillation, either atmospheric distillation or pressure-reduced distillation may be used. In order to suppress decomposition during distillation processing, the purification using distillation is preferably conducted under an inert gas atmosphere such as nitrogen. In the case of purification using recrystallization, a solvent having not reactive to the ionic liquid is used.

COMPARATIVE EXAMPLE 1

1-hexyl-3-methylimidazolium tetrafluoroborate

<Evaluation Method>

For refractive index, measurement was conducted according to JIS K2101. For non-dryness, an evaporation amount test according to JIS C2201 in which an electrical insulation oil was left under an atmosphere of 30° C. for 24 hours was conducted, and an evaporation amount of less than 1 wt % is determined to be favorable (○). For visual appearance, the specimen was taken into a glass beaker to check whether there is turbidity. Meanwhile, in a light application test, a fixed amount (40±0.5 g) of specimen was placed on a petri dish with a diameter of 9 cm, a 20 W white color lamp was used as a light source, light 15 cm away from the specimen was applied to the specimen for a fixed period of time (24 hours or 120 hours), the resulting change in refractive index was measured, and if there was no change, the result was determined to be favorable (○). In a heat deterioration test, a fixed amount (40±0.5 g) of specimen was placed in a 50 ml stopper-equipped conical flask, and left in a constant-temperature bath with a fixed temperature (40° C. or 70° C.) for 24 hours, and the resulting change in refractive index and hue were measured and if there was no change, the result was determined to be favorable (○).

For corrosion resistance, a total acid number and an effect on a dye for a smear were measured according to JIS K2510 and JIS K2400 to determine whether a corrosive property can be seen, and if no corrosive property was seen, the result was determined to be favorable (○). For contrast, an immersion solution was put in a microscope, chrome was vapor-deposited to observe a black-and-white line appearing on the plate, and if the black-and-white line is clear, the result was determined to be favorable (○). In this case, for a distal end lens of an objective lens of a microscope, the product name Amorphous Polyolefin APO (manufactured by Mitsui Petrochemical Industries, Ltd.) was used. The transmissivity was measured according to JIS K0115, and the transmissivity of no less than 95% was determined to be favorable (○). For plastics resistance, an immersion solution is charged into a clean glass container including a piece of plastic having a flat shape with a thickness of 0.5 cm and dimensions of 1 cm×1cm so that the flat plate is submerged, and the outer surface shape after passage of 24 hours was observed. For the plastic material, polypropylene, polyethylene and polystyrene were used, and if none of the plastic materials suffered alternations including deformation, the result was determined to be favorable (○).

An evaluation of auto fluorescence of the immersion solution was performed by means of comparison relative to a commercially-available immersion oil. In other words, a value (Nx) of a ratio between background noise including noise attributable to an immersion solution according to the present invention and a signal strength (N/S) where a ratio between background noise including noise attributable to the commercially-available immersion oil and a signal strength (N/S) is taken as 1 was calculated. Reasons why a result of evaluation of auto fluorescence was expressed by this method are that: the value varies depending on the measurement instrument if such value is expressed by, e.g., an absolute value of noise/signal strength; and because the noise is focused, the reciprocal of what is normally indicated by S/N was employed. The fluorescence measurement was made with B excitation, an excitation wavelength of 488 nm and fluorescence wavelengths of 510 to 550 nm. Then, a value Nx of no more than 0.5 is determined to be favorable (Δ), and a value Nx of no more than 0.2 was determined to be very favorable (○).

For the immersion solution according to example 1, measurement was made with G excitation (excitation wavelength of 533 nm and fluorescence wavelengths of 570 to 630 nm) in addition to B excitation. While Nx=0.18 in the B excitation, Nx=0.05 in the G excitation.

Furthermore, an impurity metal content was measured by an atomic absorption method.

<Evaluation Results>
Evaluation results are indicated in Table 1.

TABLE 1

| Parameters | Example 1 | Example 2 | Example 3 | Example 4 | Example 5 | Example 6 | Example 7 | Comparative example 1 |
|---|---|---|---|---|---|---|---|---|
| Coloring metal impurities amount (ppm) | 1.1 | 1.3 | 1.6 | 0.2 | 0.4 | 0.5 | 0.5 | 12 |
| Refractive index | 1.65 | 1.65 | 1.72 | 1.80 | 1.65 | 1.65 | 1.72 | 1.43 |
| Non-dryness | • | • | • | • | • | • | • | • |
| Visual appearance | • | • | • | • | • | • | • | • |
| Light application test | • | • | • | • | • | • | • | • |
| Heat deterioration test | • | • | • | • | • | • | • | • |
| Corrosion resistance | • | • | • | • | • | • | • | • |
| Transmissivity | • | • | • | • | • | • | • | • |
| Plastics Resistance | • | • | • | • | • | • | • | • |
| Auto fluorescence | • | • | • | • | • | • | • | • |

As indicated in the evaluation results above, the immersion solutions of the examples each have a high refractive index and exhibit stable characteristics even in long-time use.

Although the immersion solutions according to the above-described examples are stable, during long-time storage, a halogen element may be liberated to form impurities that cause a decrease in transmissivity. Thus, it is preferable that a storage container for each of the immersion solutions always include an absorbent that is in contact with the immersion solution. For the absorbent, as has already been described, e.g., silica gel, activated carbon, alumina and clay can be used; however, it is preferable to use silica gel or activated carbon.

For the halogen element, for example, free iodine in an immersion solution containing iodine is preferably controlled to have a predetermined concentration or lower by means of quantitative analysis. For quantitative analysis of iodine, for example, an iodine titration method or an absorptiometric method after iodine extraction may be employed. The iodine titration method may be, for example, a titration method using a sodium thiosulfate solution, which is described in JIS K0102. The iodine extraction absorptiometric method may be, for example, a method in which an absorbance for a wavelength of 515 nm is measured after chloroform extraction, which is described in JIS K0102.

As is clear from the fact that there was no change in hue even after a heat deterioration test, the immersion solutions according to the above-described examples exhibit only a small increase in free iodine.

While the immersion solutions used for a fluorescence microscope have been described, usage of the immersion solutions is not limited to fluorescence microscopes. For example, when an observation using a microscope is conducted under high temperature, water having a boiling point of 100° C. cannot be used at a temperature of approximately no lower than 50° C. when generation of bubbles and evaporation are taken into consideration. Also, an immersion solution having a high boiling point and low stability cannot be used because the immersion solution alters during use.

Meanwhile, an immersion solution according to the present invention has a refractive index of no less than 1.6, and is hard to alter even under high temperature of no lower than 50° C. Furthermore, the immersion solution can be used as an immersion solution for a special microscope observation under ultrahigh temperature of around no lower than 100° C. and no higher than 300° C.

Also, in semiconductor circuit manufacturing, a projection lens in an exposure apparatus is used to expose a photoresist applied to a wafer, whereby patterning is performed; however, finer patterning can be performed by charging an immersion solution between the projection lens and the wafer. However, known immersion oils and the like cannot be used because there are problems such as generation of microscopic bubbles and generation of microscopic particles resulting from decomposition, ultrapure water having a low refractive index (n=1.33) is used as an immersion solution. Meanwhile, an immersion solution according to the present invention not only has a high refractive index, but also has high stability and no problems such as generation of bubbles and generation of microscopic particles, and thus can be used for an exposure apparatus for semiconductor circuit manufacturing.

In other words, the present invention is not limited to the above-described embodiment, and various alternations, modifications and the like are possible as long as such the alternations, modifications and the like do not change the spirit of the present invention.

What is claimed is:

1. An immersion solution for a microscope, the immersion solution comprising an ionic liquid that transmits light having a predetermined wavelength, the ionic liquid including a metal-halogeno complex anion containing chlorine, bromine or iodine and a metal element, and a cation.

2. The immersion solution for a microscope according to claim 1, wherein a transmissivity of the light with a predetermined wavelength is no less than 30% per 1 mm of the immersion solution.

3. The immersion solution for a microscope according to claim 2, wherein the immersion solution has a refractive index of no less than 1.60 and no more than 1.90.

4. The immersion solution for a microscope according to claim 3, wherein the metal element includes one or more types of metal elements selected from Sn, In, Bi, Sb, Zn and Al.

5. The immersion solution for a microscope according to claim 4, wherein the immersion solution has an impurity metal element content of no more than 10 ppm.

6. The immersion solution for a microscope according to claim 5, wherein the cation includes an imidazolium cation, a pyridinium cation, a pyrrolidinium cation or an ammonium cation.

7. The immersion solution for a microscope according to claim 6, wherein the immersion solution is used for a fluorescence microscope.

8. The immersion solution for a microscope according to claim 7, wherein the predetermined wavelength includes 450 to 600 nm.

9. The immersion solution for a microscope according to claim 8, wherein the ionic liquid, and an ionic liquid having a refractive index lower than that of the ionic liquid are mixed.

10. The immersion solution for a microscope according to claim 9, wherein the ionic liquid having the lower refractive index does not contain a metal-halogeno complex ion as an anion.

* * * * *